March 29, 1955  H. J. STINGER  2,705,303
ELECTRONIC TACHOMETER
Filed April 22, 1952
2 Sheets-Sheet 2
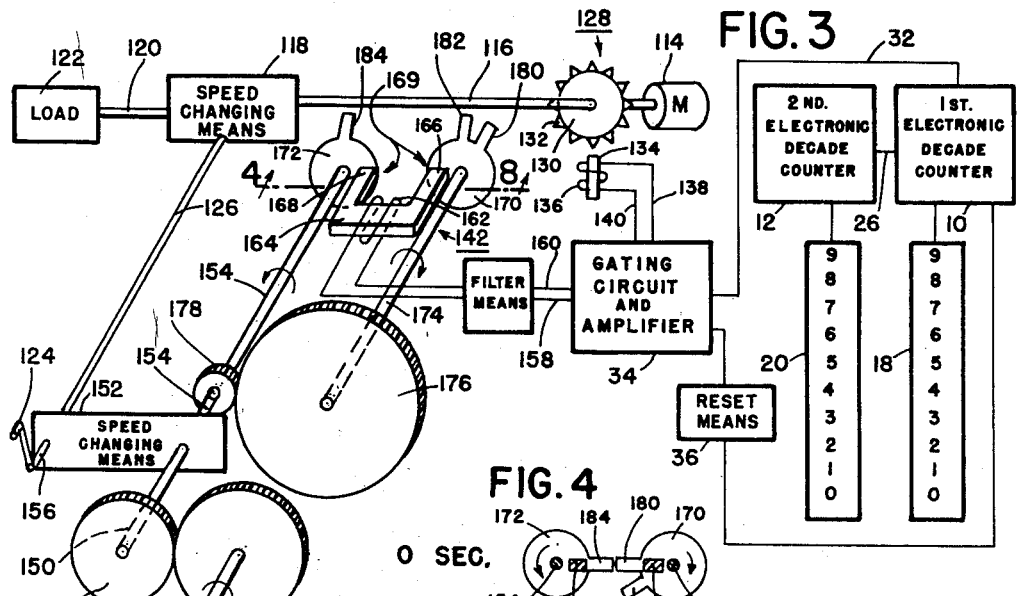
FIG. 3
FIG. 4  0 SEC.
FIG. 5  X/2 SEC.
FIG. 6  X SEC.
FIG. 7  3X/2 SEC.
FIG. 8  2X SEC.
FIG. 9
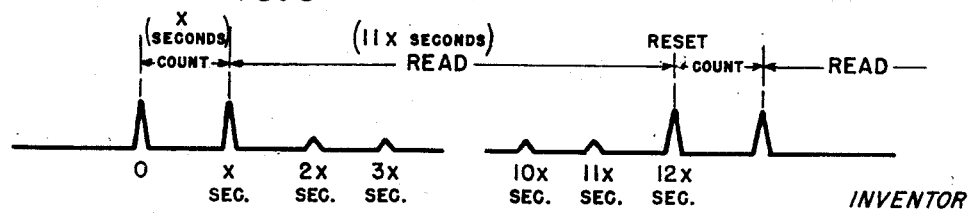
INVENTOR
HENRY J. STINGER
BY William C. Babcock ATTORNEY

United States Patent Office 2,705,303
Patented Mar. 29, 1955

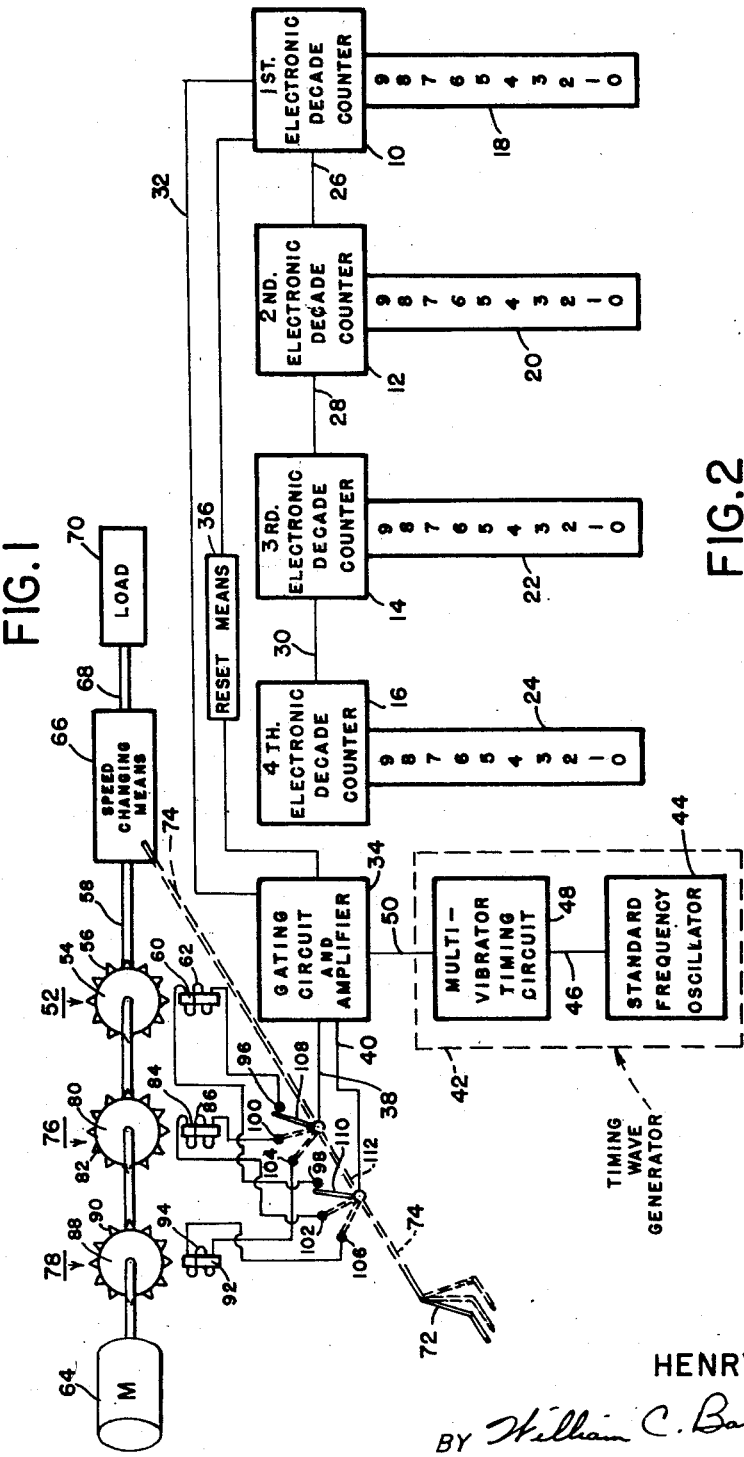

2,705,303

ELECTRONIC TACHOMETER

Henry Joseph Stinger, Wilmington, Del., assignor to General Mills, Inc., a corporation of Delaware Application April 22, 1952, Serial No. 283,679

20 Claims. (Cl. 324—70)

The present invention relates to speed or frequency measuring devices and more particularly to an improved electronic tachometer.

Counting devices of an electronic type are already known in which the number of signals received during a given time interval can be recorded or indicated visually. Some attempts have been made to utilize such electronic counting devices in the construction of tachometers for measurement of high speeds and frequencies. For example, in one such prior tachometer, the electronic counting device is said to count a fixed predetermined number of signals of the unknown frequency. Simultaneously, the number of signals of a known frequency are counted to determine how many such signals will be received while the original counting device receives the predetermined number of signals of unknown frequency. Then from the number of signals of known frequency, the time interval required for counting the predetermined number of unknown signals can be determined. By computation from this total time interval and the predetermined number of unknown signals received, the unknown frequency can then be computed. Obviously, such a tachometer involves problems of computation which do not adapt it to the instantaneous indication of unknown speeds and frequencies.

In some installations, it is desirable to indicate the speed or frequency of apparatus in which speed-changing mechanism provides a wide range of speeds. In prior known tachometer installations sometimes, because of the nature of the particular installation, the tachometer signals must be generated from one of the input shafts ahead of the speed-changing mechanism. In such a case the tachometer can be adjusted for one speed range but then will not work satisfactorily when the speed changing mechanism is shifted to provide a different driving ratio from the input shaft to the particular load.

With the above problems of the prior art in view, it is one object of the present invention to provide an improved direct reading tachometer from which the instantaneous speed or frequency may be readily observed or recorded.

A further object is the provision of a tachometer in which signals of unknown frequency are counted during a predetermined time interval, after which the electronic counting device retains a visual indication of the frequency during a desired reading interval.

Another object is the provision of such a tachometer in which there is automatic and continuous repetition of the counting and reading intervals so that the instantaneous frequency or speed may be observed directly from moment to moment.

Another object is the provision of a tachometer for use with installations having a speed-changing device and in which different signal generators are provided for the different speed ranges of the installation.

A further object is a tachometer of the above type in which the different signal generators are selectively and automatically connected to the counting device for the proper speed range when the speed-changing mechanism is adjusted.

Still another object is the provision of an improved timing pulse generator for such an electronic tachometer, to provide sharp accurate pulses at unequal counting and reading time intervals.

Other objects and advantages will be apparent from the following specification in which certain perferred embodiments of the invention are described.

In the drawings which form a part of this application and in which like reference characters indicate like parts, Figure 1 is a schematic diagram of an electronic tachometer according to the present invention, showing details of the switching means for the different signal generators, as well as the major combination of circuit features involved.

Fig. 2 is a graph showing one form of timing pulse suitable for controlling the gating circuit of the tachometer of Fig. 1.

Fig. 3 is a schematic view of a portion of the tachometer of Fig. 1 but with an improved variable timing pulse generator according to the present invention.

Figs. 4 through 8 are diagrams showing the relative movement of the rotating timing pulse generator members of Fig. 3 in different positions of operation, and Fig. 9 is a diagram of the type of pulse generated by the timing pulse generator shown in Figs. 3 through 8.

As illustrated in Figure 1, the electronic tachometer according to the present invention utilizes a plurality of electronic decade counters as indicated at 10, 12, 14, and 16. Each counter has associated with it an indicating device which preferably includes a scale numbered from zero through 9, inclusive, the respective scale numerals being illuminated by neon tubes according to the number of signals received by the counter in a predetermined counting interval. These indicating devices are shown at 18, 20, 22, and 24, respectively.

The four decade counters are connected successively as shown schematically at 26, 28, and 30. Thus the first counter will register the unit pulses received, while every tenth unit pulse will change the registration on the second counter. The hundreds and thousands will be shown in similar fashion on the third and fourth counters. Since electronic decade counters and their inter-connection are well known in the art, they will not be described further herein. It should be noted, however, that the indicia are arranged side by side in such a manner that an observer can read the figures from left to right of the counters and thus obtain a direct indication of the numbers.

The signals to be counted by the system just described are brought to the first electronic decade counter by a connection shown at 32 from an appropriate gating circuit and amplifier 34. A reset circuit 36 between the gating circuit and electronic decade counters is also incorporated in known manner for resetting all the counters to zero at the end of the desired reading interval and preliminary to the start of another counting cycle.

The gating circuit and amplifier may be of known construction designed to permit the passage of signals to the decade counters for a predetermined counting time, after which the gating circuit is closed to prevent the passage of further signals and retain the accumulated reading on the counters for a predetermined reading time.

For this purpose the gating circuit is controlled by a timing pulse generator which is illustrated in Figure 1 in standard form as including a standard frequency oscillator 44 connected at 46 to a multivibrator timing circuit 48 which feeds the desired timing pulses through the connection 50 to the amplifier and gating circuit.

Figure 2 illustrates one type of timing pulse which may be obtained from the timing pulse generator 42 to provide the desired control for the gating circuit. As illustrated, this timing pulse includes a positive pulse whose duration corresponds to the desired counting time during which the gating circuit is to be open. These individual pulses are separated by a period of time corresponding to that during which the decade counters are to be read. For the convenience of the observer this reading time is preferably much greater than the counting time during which the timing pulse lasts. The gating circuit is also connected in such manner that the reset circuit 36 is actuated at the end of the reading interval, for example by the start of the pulse which initiates and determines the next counting interval.

The signals to be counted are fed to the gating circuit and amplifier by connections 38 and 40. These connections in turn receive the signals through a switching means, to be described below, from a suitable signal generator designed to provide signals at a frequency proportional to the speed or frequency of the part to be measured. For example, the signal generator 52 is illustrated as including a rotary member or wheel 54 having a predetermined number of teeth 56 and secured to a shaft 58 for rotation therewith. A magnetic pick-up 60, including a coil 62, provides the signals which ultimately reach the gating circuit through connections 38 and 40. The number of signals generated by the pick-up or generator 60 will correspond to the number of teeth 56 which pass the pick-up during the counting interval. By suitable correlation of this number of teeth with the counting time during which the gating circuit is open, it is possible to obtain on the decade counters 10, 12, 14, and 16 a direct reading of the speed of shaft 58 or of any other shaft associated therewith.

In the present instance, the tachometer is designed for use in connection with a load device or installation in which speed-changing mechanism is incorporated for a wide range of variation in load speed. In many such installations it is impracticable to locate the signal or pulse generator 52 directly on one of the load or output shafts.

Here the shaft 58 is driven by a motor or power source 64 and serves as the input shaft for a speed-changing mechanism illustrated schematically at 66. The output shaft 68 of this speed-changing mechanism 66 is connected in turn to the load device illustrated schematically at 70.

The speed-changing mechanism 66 includes a control member 72 connected, as shown schematically at 74, with the mechanism 66 and movable between two or more different positions in which different driving ratios are established between the input shaft 58 and output shaft 68. For a given setting of the speed-changing means, and the resulting known driving ratio between input shaft 58 and output shaft 68, it is possible to correlate the number of teeth 56 on signal generator 52 and the length of the counting interval during which the gating circuit 34 is open in such a manner that the decade counters will actually register the angular velocity of output shaft 68 in degrees per second. By way of example, assume that wheel 54 has 200 teeth and that input shaft 58 is to be rotated at different speeds somewhere in the range of 2500 revolutions per minute or $2500/60$ revolutions per second. Assume further that for this particular setting of the speed-changing means 66, the driving ratio from input to output shafts is such that if input shaft 58 rotates at exactly $2500/60$ R. P. S., then output shaft 68 will rotate at 400 degrees per second. In order for the decade counters 10, 12, 14, and 16 to indicate 400 directly, the counting time $x$ during which the gating circuit must remain open can be determined as follows:

$$x = \frac{I}{TS}$$

where $I$ is the final indication in degrees per second (in this case 400)
$T$ = number of teeth on generator wheel, and
$S$ = speed of wheel in revolutions per second.

Thus in this case, $$x = \frac{I}{TS} = \frac{400}{200 \cdot 2500/60} = 0.048 \text{ second}$$

In order that the device may provide a more accurate count, e. g., to include tenths of a degree per second, the counting interval may be taken as $10x$ or 0.48 second. For the particular case illustrated, this would give a count of 4,000 during the gating pulse at an output shaft speed of exactly 400 degrees per second. Thus the output shaft speed would be read directly by placing the decimal point between the figures shown on the first and second electronic decade counters 10 and 12, respectively. In other words, for this particular gating pulse, number of teeth, and the assumed driving ratio established by the speed-changing mechanism, and for speeds for rotation which vary from the 400 degrees per second speed used for purposes of computation and illustration, the exact speed of rotation of shaft 68 can be read directly by reading tenths of degrees per second on counter 10, unit degrees per second on counter 12, tens of degrees per second on counter 14, and hundreds of degrees per second on counter 16.

If now, the control member 72 for the speed-changing means 66 is moved to a different position to provide a different driving ratio between the input shaft 58 and output shaft 68, it will be apparent that the decade counters 10, 12, 14, and 16 will still count the number of pulses received during the predetermined counting time, but if generating wheel 54 is utilized with its assumed 200 teeth, the number of pulses counted during this time interval will no longer correspond to the speed of shaft 68 in degrees per second. A conversion factor corresponding to the ratio or difference of the driving ratios through the speed-changing means would have to be applied as a correcting factor.

In order to retain the advantages of a direct reading tachometer over a wide range of speeds which can be provided by changes in the driving ratio through speed-changing means 66, the present invention contemplates the provision of additional signal generators 76 and 78 connected to and rotated by the input shaft 58. One such generator is utilized for each alternate position and adjustment of the speed-changing means 66. The illustration provides three different adjustments of the speed-changing means and three signal generators 52, 76, and 78. Generator 76 includes a rotary disk or wheel 80 provided with teeth 82, in combination with a magnetic pick-up 84 having a coil 86. Similarly, the signal generator 78 has a rotary member 88 on shaft 58 provided with teeth 90 cooperating with a magnetic pick-up 92 having a coil 94.

The device of Fig. 1 includes switching means for selective connection of any one of the signal generators 52, 76, and 78 to the input circuit 38 and 40 for the gating circuit and counting units. A three-position double-pole switch is illustrated in Figure 1 for this purpose. Here the generator coil 62 is connected to a terminal 96 of one switch and a corresponding terminal 98 of the other switch. Similarly, coil 86 is connected to a terminal 100 of one switch and a corresponding terminal 102 of the other switch, while coil 94 has its ends connected to a terminal 104 on the first switch and a corresponding terminal 106 on the second switch.

First and second switch members 108 and 110 connected to the input lines 38 and 40 are interconnected as shown schematically at 112 for joint movement selectively to any one of the three positions illustrated. In the heavy line position of Figure 1 the circuit to input lines 38 and 40 is completed from signal generator 52 and its coil 62. Movement of the switch members 108 and 110 to the remaining positions illustrated in dotted lines serves for selective connection of the input lines 38 and 40 to either the terminals 100 and 102 of coil 86, or the terminals 104 and 106 of coil 94.

The number of teeth 82 on generating wheel 80 of generator 76 will be different from the number of teeth 56 in generator 52 and will be selected in the same general manner illustrated in the above example for a different setting of the speed-changing means 66. By taking into account the driving ratio from input shaft 58 to output shaft 68 for this second or alternate setting of the speed-changing mechanism, and in this case by utilizing the same counting time required for generator 52 when the speed-changing means is in its first position, it is possible to provide a number of teeth 82 which will result in direct indication on the decade counters 10, 12, 14, and 16 of the output shaft speed at 68. This indication will be in the same units in which readings were obtained when the speed-changing means was in its first position and generator 52 was utilized, i. e., in this case in degrees per second.

Similarly, the number of teeth 90 on wheel 88 of generator 78 will be selected with relation to the same counting time previously considered and with respect to still a third adjustment of the speed-changing means which will provide another driving ratio between input shaft 58 and output shaft 68. Here again, selection of the proper number of teeth in the above manner will provide a direct reading on the decade counters showing the speed of output shaft 68 in the same units, degrees per second.

According to one important feature of the invention, the switching means 108, 110 and the control member 72 for adjustment of speed-changing means 66 are interconnected for automatic selection of the appropriate signal generator 52, 76, or 78 in response to movement of the speed control member 72 to any one of the adjusted positions which determines the driving ratio through speed-changing means 66. This connection is illustrated schematically in Figure 1 by the dotted line or shaft 74. Thus upon movement of the speed control member 72 to its first position shown in heavy lines in Figure 1, the switch members 108 and 110 will be moved automatically to their first position in which they engage terminals 96 and 98 and thus complete the circuit from signal generator 52 to the gating circuit and electronic counters.

As already pointed out, the correlation of this particular speed adjustment and the number of teeth on generator 52 provides a direct reading in degrees per second showing the speed of output shaft 68 for this particular driving ratio of the speed-changing means 66. Movement of the control member 72 to either of its other positions shown in dotted lines in Figure 1 will automatically move the switch members 108 and 110 to engage either the contacts 100 and 102 or the contacts 104 and 106. Thus the circuit to the gating and counting units will be automatically completed from the appropriate signal generator 76 or 78 to provide again a direct and accurate reading on the decade counters showing the speed of output shaft 68 while the speed-changing means 66 is in one of its other adjusted positions.

The tachometer just described in connection with Figure 1 provides a direct reading of output shaft speed for all changes in the adjustment of the driving ratio through the speed-changing device, by selective connection into the circuit of an appropriate signal generator on the input shaft. Another possibility of maintaining the direct reading of output shaft speed on the decade counters is illustrated in Figure 3 in which the gating pulse or pulses which determine the counting time are varied in accordance with adjustment of the speed changing device. Since certain portions of the device of Figure 3 are identical to the corresponding portions of the device of Figure 1, the same numerals have been used for convenience. Thus the counting unit includes a plurality of decade counters, two of which are shown at 10 and 12. The additional counters 14 and 16 of Figure 1 have been omitted from the diagram for brevity but would normally be included where readings to four significant figures were desired. Each counting unit includes the indicating scale 18 and 20 as in the previous embodiment and the counting unit receives signals of the unknown frequency to be counted through the connection 32 from the gating circuit and amplifier 34. The counter is reset at the end of the reading interval by the reset means 36, just as in the previous case.

Here the installation with which the tachometer is to be used is illustrated in essentially the same form as in the previous device and includes a motor or source of power 114, a power or input shaft 116 for the speed changing means 118, an output shaft 120 from the speed changing means and a load indicated schematically at 122. The speed changing means thus provides a possibility of adjustment or variations of the driving ratio between the input shaft 116 and output shaft 120. Adjustment of the speed changing means is achieved through a movable control member 124 interconnected to the speed changing means 118 as indicated at 126. Movement of the control member 124 from a first position to one or more alternate positions thus changes the adjustment of speed changing means 118 to provide the different desired driving ratios.

A signal generator 128 similar to those described in connection with Figure 1 is mounted on and rotated with the input shaft 116. This device includes the rotating disk or wheel 130 provided with teeth 132 cooperating with a magnetic pick-up 134 having a coil 136. The coil is connected at 138 and 140 to the gating circuit and provides a series of signals or pulses at a frequency which depends upon the number of teeth 132 and the speed of rotation of input shaft 116.

In this embodiment of the invention an improved timing pulse generator indicated generally at 142 is provided. This timing pulse generator is particularly designed to provide unequally spaced pulses so that the reading interval for the decade counters 10 and 12, etc., may be substantially longer than the counting time during which the gating circuit permits the passage of signals from the generator 128 to the counters.

Timing pulse generator 142 includes a motor 144 driven at constant speed from an A. C. supply in known manner. The motor is coupled through suitable gearing 146 and 148 to the input shaft 150 of another speed changing means 152. The output shaft 154 of the speed changing means drives the operating portions of the timing pulse generator to provide timing impulses which determine the counting and reading intervals for the gating circuit. The counting interval, as explained below, will depend upon the speed of rotation of output shaft 154. By adjustment of the speed changing means, this output shaft speed at 154 may be varied as desired to provide different periods of time for the counting interval during which the gating circuit is open.

In order for the decade counters and their scales to provide a direct reading of the speed of load output shaft 120, it is essential, just as in the previous case, that the number of teeth 132 in signal generator 128, the driving ratio between input shaft 116 and load output shaft 120 as determined by speed changing means 118, and the length of the counting interval, as determined in this case by speed changing means 152, be accurately correlated and determined. This can be done for a particular setting of the load speed changing means 118 corresponding to a particular driving ratio from input shaft 116 to output shaft 120.

Since only a single generator 128 is provided, with a fixed number of teeth 132, a subsequent change in setting of the speed changing means 118 through control member 124 would ordinarily eliminate the direct reading characteristics of the decade counters 18 and 20. In this case, however, the load speed control member 124 is coupled as shown at 156 to the speed changing means 152 of the timing pulse generator. Thus the counting time interval, which is dependent upon the speed of output shaft 154, may be simultaneously varied as the driving ratio between the load input and output shafts 116 and 120 is changed by the speed changing device 118. In other words, the device of Figure 3 maintains the direct reading characteristics of the counting indicators 18 and 20, etc., for a plurality of different driving ratios established by the speed changing means 118, just as in the device of Figure 1. Here the desired result is obtained by changing the counting time interval automatically in response to adjustment of the control member 124 which changes the driving ratios at the load.

As indicated above, the time interval between the impulses which determine the counting and reading periods is dependent upon the relative speed of rotation of shaft 154. These timing impulses are fed to the gating circuit and amplifier 34 by leads 158 and 160 which are connected to the coil 162 of an electromagnetic signal generator having a magnetic core 164 with spaced poles 166 and 168. An air gap 169 is accordingly provided between the poles 166 and 168 and interrupts the normal flux path from one pole to the other. The desired timing impulses are provided by means of first and second movable members 170 and 172 which are shown in this case in the form of rotating disks. Rotatable member or disk 170 is carried on a shaft 174 connected by gears 176 and 178 to output shaft 154.

Rotatable member 172 is mounted directly on shaft 154.

The first movable or rotatable member 170 has a first projection 180, which in this case extends radially from the disk so as to project substantially one-half the distance across the air gap 169 as the projection 180 passes the poles 166 and 168. It should be noted in this connection that in the particular embodiment shown in Figure 3 the rotatable members 170 and 172 lie in substantially a common plane and are rotatable about parallel axes, i. e., shafts 174 and 154. Poles 166 and 168 of the timing pulse generator lie immediately adjacent and substantially parallel to the common plane of rotation of the members 170 and 172.

The gearing 176, 178 and the adjustment of the speed changing means 152 are so interrelated as to provide for rotation of the projection 180 across air gap 169 once for each complete period of operation of the tachometer, i. e., at the beginning of each counting interval.

Member 170 also includes a second projection 182 which is angularly spaced from the first projection 180 so as to cross the first portion of air gap 169 a predetermined interval of time after the passage of projection 180. The time interval between passage of the projection 180 and projection 182 will constitute the predetermined counting interval designated as $x$ in the preceding discussion.

Because a reasonable reading interval is required for a human observer to note the indications on the four scales of the respective decade counters, the speed rotation of shaft 174 and its associated disk 170 and projections 180 and 182 will be relatively slow. For example, the total time required for one complete revolution of disk 170 may be of the order of six seconds in the situation previously discussed where a gating or counting period of slightly less than half a second was determined.

Because rotation of member 170 at roughly one-sixth of a revolution per second would thus result in relatively slow passage of the projections 180 and 182 across the corresponding portion of air gap 169, it would be difficult to generate a timing pulse from the pick-up which would have the desired sharp peaks to trigger the gating circuit. The present generator accordingly provides for rotation of the second member 172 at a higher predetermined rate such that a projection 184 on member 172 will move across the remaining portion of the air gap at a much faster speed than the movement of either of the teeth 180 and 182. The gearing 176 and 178 is so correlated as to provide for movement of projection 184 on the second disk 172 across the air gap 169 once as the first projection 180 of disk 170 moves across its part of the air gap, and again as the second projection 182 of disk 170 moves across the same air gap.

In other words, for the assumed example of roughly one-half a second counting time, the projection 184 would move past the air gap approximately every half second. Rotation of the members 170 and 172 must be synchronized so that the projections on each disk cross the line joining the axes of rotation of the disks at exactly the same instant. Thus, as illustrated in Figure 4, projections 180 and 184 will lie on the line joining the centers of shafts 178 and 154 and will each cover approximately half of the air gap 169 so as to provide a more nearly complete magnetic path from one pole 166 to the other pole 168 of magnetic pick-up 164.

Continued operation of the timing pulse generator from the initial position of Figure 4, which corresponds to the start of a counting interval, may result in movement of the parts to the position shown in Figure 5. Here it is assumed that the projection 184 will move across the air gap once at the beginning of the counting interval and again at the end of the counting interval, although it will be understood that under certain conditions a higher relative speed of operation for projection 184 might be feasible so that the projection would pass the air gap one or more additional times between the points at which projections 180 and 182 reach the gap. In any event, Figure 5 illustrates the situation where poles 180 and 182 have moved so that half of the counting interval $x$ has elapsed, and projection 184 is diametrically opposite the air gap 169.

Upon further rotation, the position of Figure 6 will be reached in which the second projection 182 of the first disk 170 will be aligned across the air gap between the poles 166 and 168, while the projection 184 on the second disk 172 also reaches this aligned position. It will be understood that while projection 182 will pass the pole faces relatively slowly, the projection 184 will move much more rapidly. Thus at the instant that the projections 184 and 182 are in substantial alignment between the axes of shafts 154 and 178, there will be a brief moment in which the magnetic path between the poles 166 and 168 is substantially completed. Hence a sharp pulse is generated to trigger the end of the counting interval, i. e., the start of the reading interval. During the next period of time corresponding to another half of the counting interval, the parts will move to the position of Figure 7 in which both projections 180 and 182 have passed beyond the air gap immediately between the poles, while projection 184 has moved to a diametrically opposite position.

In Figure 8, the completion of the next revolution of projection 184 past the air gap 169 is illustrated. Here there will be a sharp pulse, but a relatively small one because projection 184 extends only half way across the gap and leaves a substantial remaining portion of the gap to decrease the amplitude of the generated pulse. Thus, as illustrated in Figure 9, there will be a sharp pulse indicated at the start of the counting interval corresponding to Figure 4, another sharp pulse of substantial amplitude at the end of $x$ seconds (i. e., the desired counting interval), corresponding to the position of Figure 6, and then a series of intermediate sharp pulses of much smaller amplitude as illustrated at $2x$, $3x$ seconds, etc., during the time when only the projection 184 passes the air gap before projection 180 again reaches the pole faces.

The series of pulses of smaller amplitude illustrated at $2x$, $3x$, etc., in Figure 9 can be filtered out of the timing wave by a suitable filter network incorporated in the gating circuit and amplifier in known manner, while the pulses of major amplitude indicated at 0 seconds and $x$ seconds will determine the beginning and end of the counting interval and in the same manner the beginning and end of the reading interval as illustrated in the drawing. Thus a timing wave generator is provided in which a relatively low total frequency for the complete interval of counting time plus reading time may be obtained, while at the same time the desired sharpness of the signal pulses is achieved by rapid movement of the projection 184 across the air gap at a much higher rate and synchronized with passage of the projections 180 and 182 on the slower moving rotary member 170 which determines the desired intervals.

From the above description it will be understood that for a particular pair of disks 170 and 172 the ratio between counting and reading times will remain the same, but the actual counting interval will be varied by changes in the speed of shaft 154. This speed is controlled by the speed changing means 152 in combination with a particular gearing selected in the synchronous A. C. motor 144 as previously described. Thus the tachometer of Figure 3 will provide a direct reading on its decade counter indicators 18, 20, etc., to show the exact speed of rotation of load output shaft 120, for any of the adjusted positions of the speed changing means 118.

The timing pulse generator 142 will open the gating circuit and start the counting interval upon simultaneous passage of the projections 180 and 184 across the air gap as in Figure 4, and will close the gating circuit to end the counting interval as the second projection 182 meets the projection 184 in the air gap as illustrated in Figure 6. The indicators 18, 20, etc., will then maintain the reading which has been counted during the counting interval during the reading period which follows. At the end of the reading period the reset means 36 will be operated to set the various indicators back to zero and start another counting interval as previously described.

Thus according to the present invention, an electronic tachometer has been provided which accomplishes the objects set forth at the beginning of the specification. The tachometer includes a novel timing pulse generator which is particularly useful for providing unequally spaced signals and for permitting adjustment of the total time interval between corresponding signal pulses.

Since minor variations and changes in the exact details of construction will be apparent to persons skilled in this field, it is intended that this invention shall cover all such changes and modifications as fall within the spirit and scope of the attached claims.

Now, therefore, I claim:

1. An electronic tachometer comprising a generator which supplies signals at a frequency proportional to the speed of a part to be tested, electronic counting means having visible indicating means showing the part speed corresponding to the number of signals received during a predetermined counting interval, a gating circuit controlling the passage of said signals to said counting means, and timing pulse generator means supplying predetermined control pulses to said gating circuit and thereby opening the latter during the predetermined counting interval and closing the gating circuit during a predetermined reading interval, said timing pulse generator means supplying a series of uniformly unequally spaced control pulses whereby said reading interval is substantially longer than said counting interval and said counting and reading intervals are progressively and automatically alternated giving a substantially continuously changing visible indication of the instantaneous speed of said part.

2. In a tachometer for a driving mechanism having a power shaft, a load shaft and intermediate speed changing mechanism having control means movable to different positions for selection of different predetermined driving ratios from power to load shafts, the improvement comprising means driven by the power shaft for generating signals at a frequency having a definite ratio to the speed of the power shaft and thereby being proportional to the load shaft speed when said speed changing control means is in one position, an electronic counting device for counting the number of signals received during a given counting period, a gating circuit controlling the passage of signals from the generator to the counting device, and a timing pulse generator providing pulses triggering the gating circuit and thereby repeatedly opening the latter during a counting interval in which signals are passed to the counting device and then closing the gating circuit during a reading interval in which the counting device registers the number of signals received in the preceding counting interval, and means interconnected with said speed changing control means automatically changing at least one factor selected from the group consisting of said counting interval time and said definite ratio of signal frequency to power shaft speed in response to movement of the speed changing control means to a different position and thereby providing at the counting device in each reading interval a signal total directly indicating the load shaft speed regardless of movement of the speed changing control means between said one position and said different position.

3. An electronic tachometer according to claim 2 in which said speed changing control means and timing pulse generator are interconnected for automatic variation of the counting interval in response to movement of the speed changing control means between said one position and said different position.

4. In a tachometer for a variable-speed driving mechanism having an input shaft, an output shaft and intermediate speed-changing mechanism including a control member movable to at least first and second different positions establishing first and second different predetermined driving ratios between said input and output shafts, the improvement comprising at least first and second signal generators each having a rotary generating member with one or more poles driven by the power shaft, the number of poles and the driving connection of each rotary member to the power shaft being correlated and providing signals from the first generator at a frequency which is proportional (at a definite ratio) to the speed of the output shaft when the control member is in its first position and also providing signals from the second generator at a frequency which is proportional (at the same definite ratio) to the speed of the output shaft when the control member is in its second position, an electrical counting device for counting the number of signals received during a given counting period, and switching means connected in circuit between said counting device and said first and second signal generators, said switching means being movable between at least a first position in which only the signals from the first signal generator are fed to said counting device and a second position in which only the signals from the second signal generator are fed to the counting device.

5. A tachometer according to claim 4 in which said first and second signal generators each include a toothed generator wheel driven at the same instantaneous angular speed by the input shaft, the number of teeth on the first generator wheel being different from the number of teeth on the second generator wheel.

6. A tachometer according to claim 5 in which the ratio of the number of teeth on the first wheel to the number of teeth on the second wheel is equal to the ratio of the output shaft speed when the control means is in said one position (at any given input shaft speed) to the output shaft speed when the control means is in said different position (at the same given input shaft speed).

7. In a tachometer for a driving mechanism having a power shaft, a load shaft and intermediate speed changing mechanism having control means movable to different positions for selection of different predetermined driving ratios from power to load shafts, the improvement comprising a first signal generator driven by the power shaft and responsive to rotation thereof to generate signals at a frequency proportional (in a predetermined ratio) to the speed of the load shaft when said speed changing control means is in one position, a second signal generator driven by the power shaft and responsive to rotation thereof to generate signals at a frequency proportional (in the same predetermined ratio) to the speed of the load shaft when said control means is in a different position, an electrical counting device for counting the number of signals received during a given counting period, switching means connected in circuit between said counting device and said first and second signal generators, and means interconnecting the speed changing control means and switching means and automatically moving the switching means to a first position in which only the first signal generator is connected to the counting device in response to movement of the control means to said one position, and automatically moving the switching means to a second position in which only the second signal generator is connected to the counting device in response to movement of the speed changing control means to said different position.

8. A tachometer according to claim 7 in which said electric counting device includes electronic counting means having a visible indicator responsive to the number of signals received in a predetermined counting interval, said indicator being graduated to indicate numerically the actual load shaft speed corresponding to the number of signals received during said counting interval, a gating circuit connected between said switching means and electronic counting means and controlling the passage of signals to the latter, and a timing pulse generator supplying predetermined control pulses to said gating circuit and thereby opening and closing the latter for passage of signals during the predetermined counting interval and for exclusion of signals from the electronic counting means during a predetermined reading interval.

9. A tachometer according to claim 8 in which said timing pulse generator includes a pick-up having a magnetic flux path with an air gap therein, a first cyclically movable member having a pair of projections thereon movable repeatedly across one portion of said air gap with the first projection moving across the gap at the start of a desired counting interval and the second at the end of the counting interval, and a second cyclically movable member having a single projection thereon synchronized for rapid movement across the remaining portion of the gap once at the same instant the first projection of the first cyclically moving member moves across and again at the same instant said second projection moves across.

10. A timing pulse generator comprising first and second members mounted for movement along predetermined paths with a given intermediate space between them at one point in said paths, each member having a projection which at said one point in its path extends into said space toward the other member, means for moving the first member repeatedly past said point at a predetermined speed which moves the projection on said first member repeatedly across said intermediate space at a desired signal frequency, means for moving the second member repeatedly past said point at a higher predetermined speed which moves the projection on said second member across said intermediate space more than once for each passage of the projection on the first member, the moving means for said members being synchronized for rapid movement of the projection on the second member across the intermediate space at the same instant the projection on the first member moves more slowly across said space, and pulse generating means having a flux path which includes said intermediate space, thereby generating repeated sharp major pulses at said desired signal frequency corresponding to the simultaneous movement of both projections across said space and a series of intermediate lesser pulses corresponding to the more frequent intermediate movement of only the projection on said second member across said space.

11. A timing pulse generator according to claim 10 having filter means in circuit with said pulse generating means, said filter means substantially eliminating said intermediate lesser pulses and passing primarily said repeated major pulses at the desired signal frequency.

12. A timing pulse generator comprising first and second rotating members mounted for rotation with a predetermined intermediate space between them, each member having a projection which in one position of rotation extends into said space toward the other member, means for rotating the first member at a predetermined rate which moves the projection on said first member repeatedly across said intermediate space at a desired signal frequency, means for rotating the second member at a predetermined higher rate which moves the projection on said second member repeatedly across said intermediate space more than once for each passage of the projection on the first member, the rotating means for said members being synchronized for rapid movement of the projection on the second member across the intermediate space at the same instant the projection on the first member moves more slowly across said intermediate space, and pulse generating means having a flux path which includes said intermediate space, thereby generating repeated sharp major pulses at said desired signal frequency corresponding to the simultaneous movement of both projections across said space and a series of intermediate lesser pulses corresponding to the more frequent intermediate movement of only the projection on said second member across said space.

13. A timing pulse generator according to claim 12 in which said one rotating member has two angularly separated projections, and said other rotating member has one projection, said rotating means being interconnected for rapid movement of said last-mentioned projection across said intermediate space first at the same instant one projection of said one rotating member moves across said space and again at the same instant the second projection of said one rotating member moves across said space.

14. A timing pulse generator according to claim 13 in which the two projections on said one rotating member are angularly spaced less than 180°.

15. A timing pulse generator according to claim 12 in which the projection on the first rotatable member extends only partially across said space toward the second member, the projection on the second member extending across the remaining portion of said space toward the projection on the first member and thereby substantially completing a flux path across said space at the instant said projections both move across the space and providing an incomplete flux path when only one of the projections moves across the space.

16. A timing pulse generator according to claim 15 in which the first and second members rotate on parallel axes, with their respective projections lying in a common plane perpendicular to said axes, and said pulse generating means including a magnetic member having spaced poles each of which has a face parallel to and immediately adjacent said plane, said pole faces being spaced along a line extending directly from one axis to the other in said plane.

17. A timing pulse generator comprising first and second members mounted for rotation on spaced parallel axes, each member having a magnetically permeable projection in a common plane perpendicular to said axes which projection in one position of rotation extends toward the other member into the intermediate space between said axes and members, a pulse generating means having a magnetically permeable body with spaced first and second poles, each of which has a pole face immediately adjacent said plane, said pole faces being spaced along a straight line extending from one axis to the other in said plane whereby the intermediate space between the rotating members provides an air gap between said pole faces, first driving means for rotating the first member at a predetermined rate which moves its projection repeatedly across the first pole face and a portion of said intermediate space and air gap at a desired signal frequency, and second driving means for rotating the second member at a predetermined higher rate which moves its projection repeatedly across the second pole face and remaining portion of said intermediate space and air gap more than once for each passage of the projection on the first member, the first and second driving means being synchronized for rapid movement of the projection on the second member across said second pole face and air gap at the same instant the projection on the first member moves more slowly across said first pole face and air gap, thereby generating repeated sharp major pulses at said desired signal frequency corresponding to the simultaneous movement of both projections across said space and at least one intermediate lesser pulse corresponding to the remaining more frequent intermediate movement of only the projection on said second member across said second pole space.

18. A timing pulse generator according to claim 17 in which each projection extends substantially halfway across the intermediate space between the pole faces at the instant when the projections simultaneously cross the line joining their axes of rotation.

19. A timing pulse generator comprising a pair of magnetically permeable circular discs mounted for rotation on parallel axes, said discs lying in a common plane perpendicular to said axes with the periphery of one disc separated from the periphery of the other by a predetermined intermediate space, a pulse generating pick-up having first and second poles, one of which is immediately adjacent each disc, with said intermediate space providing an air gap between the poles, at least one tooth projecting radially from each disc, first driving means for rotating the first disc at a predetermined rate which repeatedly moves a given tooth of said disc past the first pole and across a first portion of said air gap at a desired signal frequency, and second driving means for rotating the second disc at a predetermined higher rate thereby moving a given tooth of the second disc past the second pole and the remainder of said air gap at a higher frequency, said first and second driving means being synchronized for rapid movement of the tooth on the second disc past the second pole and across the remainder of the air gap at the same instant the tooth on the first member moves more slowly past the first pole and across the first portion of the air gap, thereby generating repeated sharp major pulses at the desired signal frequency corresponding to simultaneous movement of both teeth across the gap and at least one intermediate lesser pulse corresponding to the more frequent movement of only the tooth on said second disc across said gap.

20. An electronic tachometer comprising a generator which supplies signals at a frequency proportional to the speed of a part to be tested, electronic counting means having visible indicating means showing the part speed corresponding to the number of signals received during a predetermined counting interval, a gating circuit controlling the passage of said signals to said counting means, and a timing pulse generator supplying predetermined control pulses to said gating circuit and thereby opening the latter during the predetermined counting interval and closing the gating circuit during a predetermined reading interval, said timing pulse generator supplying a continuing series of unequally spaced control pulses whereby said reading interval is substantially longer than said counting interval and said counting and reading intervals are progressively and automatically alternated giving a substantially continuously changing visible indication of the instantaneous speed of said part, said timing pulse generator including a pick-up having a magnetic flux path with an air gap therein, a first cyclically movable member having a pair of projections thereon movable repeatedly across one portion of said air gap with the first projection moving across the gap at the start of a desired counting interval and the second at the end of the counting interval and a second cyclically movable member having a single projection thereon synchronized for rapid movement across the remaining portion of the gap once at the same instant the first projection of the first cyclically moving member moves across and again at the same instant said second projection moves across.

References Cited in the file of this patent

UNITED STATES PATENTS

| | | |
|---|---|---|
| 1,009,798 | Severy et al. | Nov. 28, 1911 |
| 1,687,233 | Stoller | Oct. 9, 1928 |
| 2,443,668 | Tagg | June 22, 1948 |
| 2,454,367 | Artzt | Nov. 23, 1948 |
| 2,559,849 | Covert | July 10, 1951 |